United States Patent [19]
Poon

[11] 3,942,617
[45] Mar. 9, 1976

[54] SELF-COMPENSATING CLUTCH/BRAKE
[75] Inventor: Sui Yun Poon, Chelmsford, England
[73] Assignee: Ransome Hoffmann Pollard Limited, Chelmsford, England
[22] Filed: June 4, 1974
[21] Appl. No.: 476,259

[30] Foreign Application Priority Data
June 4, 1973 United Kingdom............ 26603/73

[52] U.S. Cl............ 192/111 A; 192/13 R; 188/71.9
[51] Int. Cl.² ......................................... F16D 13/75
[58] Field of Search............ 192/111 A, 18 A, 13 R

[56] References Cited
UNITED STATES PATENTS

| | | |
|---|---|---|
| 2,123,315 | 7/1938 | Rossmann ..................... 192/111 A |
| 2,252,906 | 8/1941 | Williamson ................ 192/111 A X |
| 2,885,049 | 5/1959 | Staadt............................ 192/111 A |
| 3,202,247 | 8/1965 | Schmidt et al.................. 192/111 A |
| 3,540,557 | 11/1970 | Hasselbacher.................... 192/18 A |
| 3,743,070 | 7/1973 | Howard et al.................... 192/18 A |

*Primary Examiner*—Benjamin W. Wyche
*Attorney, Agent, or Firm*—Brisebois & Kruger

[57] ABSTRACT

A hydraulically operated clutch mechanism for connecting a drive shaft and a driven shaft includes a clutch normally effecting driving connection between the shafts. Hydraulically actuable means are provided for disengaging the drive connection and brake means are provided for braking the driven shaft, a mechanical linkage being provided between the hydraulically actuable means and the brake means. Actuation of the hydraulically actuable means first disengages the drive connection and then causes braking of the driven shaft. The mechanical linkage incorporates compensation means for compensating automatically for any wear of the clutch.

18 Claims, 4 Drawing Figures

SELF-COMPENSATING CLUTCH/BRAKE

This invention relates to a hydraulically operated clutch mechanism for connecting a driving shaft and a driven shaft and in particular to such a mechanism for connecting the engine output shaft and the transmission input shaft of a heavy motor vehicle.

When changing gears in a motor vehicle, following disengagement of the clutch, it is important, if transmission shocks and gear change noise are to be avoided, to synchronise the rotational speeds of the driving and driven members, this synchronisation occurring prior to the engagement of the gear wheels. For a light vehicle, such as a passenger car, this is normally effected automatically by the cone clutches of a synchromesh gear, these cones being brought into contact by movement of the gear lever during the change. This synchronisation occurs before engagement of the dogs or splines and thus avoids shock and noise during gear changes. This system is, however, not normally suitable for a heavy motor vehicle owing to the high stresses imposed on it by the large inertia forces of the rotating parts of the transmission of such a vehicle.

A mechanically operated heavy duty friction clutch is known in which the driven (transmission input) shaft is provided with a brake to overcome the inertia by reducing the shaft speed and so permitting a quick gear change. The brake is keyed to the driven shaft so that it can move axially relative thereto and into braking engagement with a fixed part of the clutch housing. This movement of the brake is effected mechanically by a "pull" action of a clutch release linkage acting, via a thrust bearing, on a clutch-disengaging device.

Such a clutch suffers from the disadvantage of all mechanically operated clutches in that wear of the clutch increases the pedal travel necessary for its operation and thus affects the "feel" of the clutch. The feel of a clutch can be defined by the expression "maximum pedal effort x pedal travel" and it is important, from the operator's point of view that a clutch should have a correct feel, that is to say the clutch engagement should be smooth and gradual and the effort and travel required to control the clutch pedal should not be excessive. Another disadvantage of such a mechanically operated clutch is that frequent adjustments are necessary to compensate for wear.

The present invention provides a hydraulically operated clutch mechanism for connecting a driving shaft and a driven shaft, the mechanism comprising a clutch normally effecting driving connection between the shafts, hydraulically actuable means for disengaging the drive connection, brake means for braking the driven shaft and a mechanical linkage between the hydraulically actuable means and the brake means, actuation of the hydraulically actuable means first disengaging the drive connection and then causing braking of the driven shaft, wherein the mechanical linkage incorporates compensation means for compensating automatically for any wear of the clutch.

Because of the compensation means, operation of the clutch occurs for the same distance of pedal travel and so the feel of the clutch is unaffected by wear. Moreover, because the clutch is hydraulically operated there is no necessity for frequent clutch adjustments to compensate for wear.

Advantageously, the hydraulically actuable means comprises a pair of stepped cylindrical members which form an annular chamber therebetween, the outer cylindrical member being slidable over the inner cylindrical member which is fast to a housing member, and the annular chamber being connectible to a source of hydraulic fluid.

The brake means may be arranged to brake the driven shaft via a disc fast to the driven shaft, the disc being lined with frictional material on its opposite side faces.

Preferably, the mechanical linkage comprises a first sleeve engagable by the outer cylindrical member and a second sleeve engagable with the brake means, the first sleeve being connected to the second sleeve by the compensation means.

The first sleeve may be spring biassed against a shoulder formed on the outer cylindrical member and the second sleeve is slidable on the outer cylindrical sleeve and on the first sleeve. In this case, the compensation means comprises at least one helical slot formed in the second sleeve and at least one peg provided on the first sleeve, there being as many pegs as there slots and the peg(s) mating with the slot(s), means normally preventing relative rotation between the first sleeve and the outer cylindrical member, and means limiting the axial movement of the second sleeve. Preferably, the means for preventing said relative rotation comprises co-operating serrated faces formed on the first sleeve and on the shoulder of the outer cylindrical member. Advantageously, a cylindrical housing member surrounding the second sleeve is provided with at least one axial slot and the second sleeve is provided with at least one peg, there being as many pegs as slots and the peg(s) mating with the slot(s), the slot(s) and the peg(s) constituting the means for limiting the axial movement of the second sleeve.

Alternatively, the first sleeve is releasably attached to the outer cylindrical member. Preferably, the inner cylindrical surface of the first sleeve is provided with a plurality of circumferential serrations which are engagable with serrations formed on a plurality of spring-loaded plungers provided radially within the outer cylindrical member, the engagement between these serrations providing the releasable attachment between the first sleeve and the outer cylindrical member. The spring-loaded plungers may be equispaced around the outer cylindrical member and the serrations on the inner cylindrical surface of the first sleeve and on the spring-loaded plungers may be of buttress tooth form. In this case, the compensation means advantageously comprises at least one axial slot formed in the first sleeve and at least one peg provided on the second sleeve, there being as many pegs as there are slots and the peg(s) mating with the slot(s).

Two forms of clutch mechanism for a heavy motor vehicle constructed in accordance with the invention will now be described, by way of example, with reference to the accompanying drawings, in which.

Figure 1:
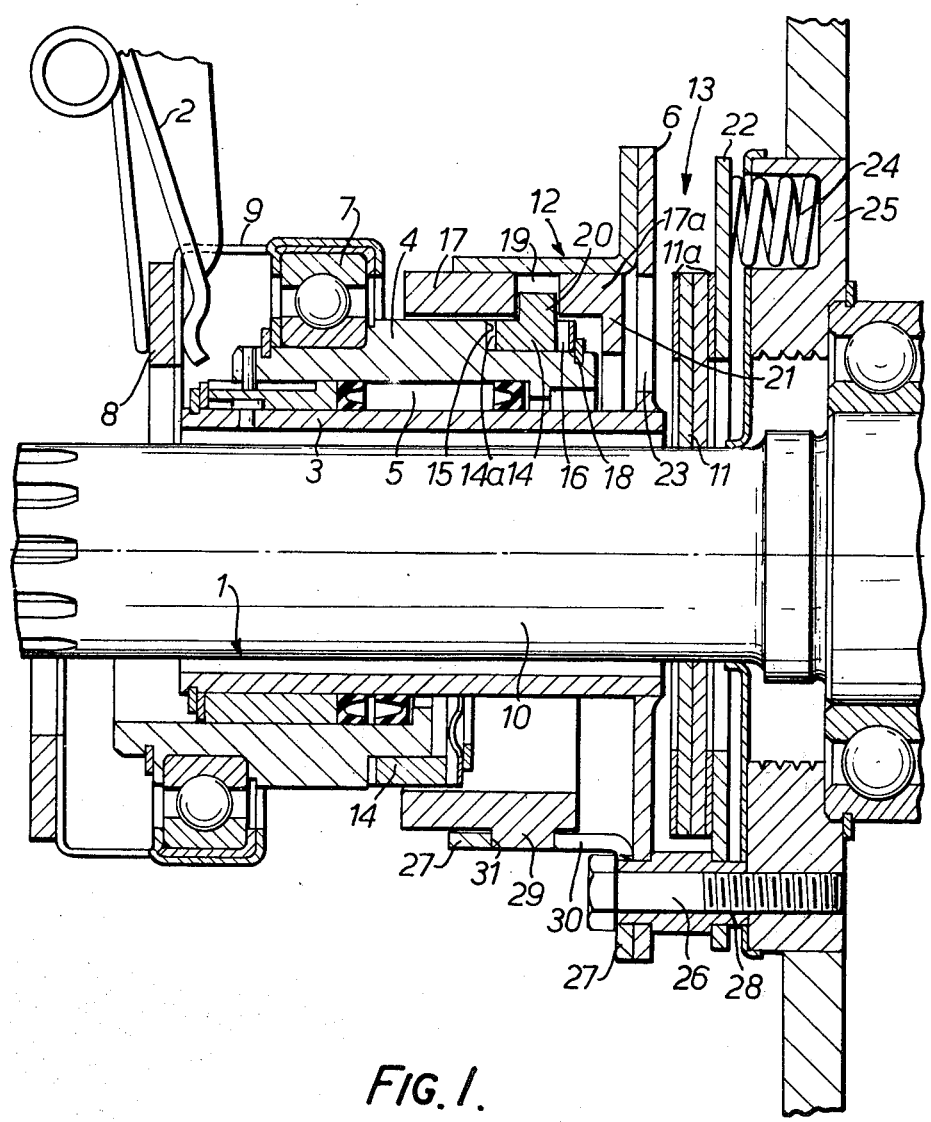
FIG. 1 is a part-sectional elevation of the first form of clutch mechanism, the top half of which shows the mechanism when the clutch is unworn and in good adjustment and the bottom half of which shows the mechanism when the clutch is worn.

Referring to the drawings, FIG. 1 shows the structure within a clutch housing (not shown). A clutch pressure plate (not shown) is arranged to be disengaged by a pull action by means of a hydraulic actuating mechanism, indicated generally by the reference numeral 1, via a number of clutch release levers 2 (only one of which is shown in FIG. 1).

The hydrualic mechanism 1 comprises a pair of stepped cylinders 3 and 4 which define a chamber 5. Hydraulic fluid can enter the chamber 5 via an inlet port (not shown) in the cylinder 4. The inner cylinder 3 is of two-part construction and is fast to the clutch housing via a flange 6, thus forming the stationary part of a piston-and-cylinder combination, the movable part of which is constituted by the outer cylinder 4. A thrust bearing 7 is rigidly mounted on the movable outer cylinder 4 and is connected to an annular ring 8 by means of a flexible spring steel member 9. The clutch release levers 2 engage that portion of the spring steel member 9 which is backed by the ring 8 so that movement of the outer cylinder 4 to the right (as seen in FIG. 1) carries the thrust bearing 7 and thus pulls the levers 2 to the right to disengage the clutch. Movement of the cylinder 4 is effected by forcing hydraulic fluid into the chamber 5. This clutch release mechanism is described in greater detail in copending patent application Ser. No. 475,106.

When the clutch is engaged the engine output shaft (not shown) drives the transmission input shaft 10 of the heavy motor vehicle. A disc 11, provided on each of its faces with an annular brake pad 11a, is fast to the shaft 10 and a mechanical linkage, indicated generally by the reference numeral 12, is provided to link the hydraulic mechanism 1 to a braking system, indicated generally by the reference numeral 13.

Figure 2:
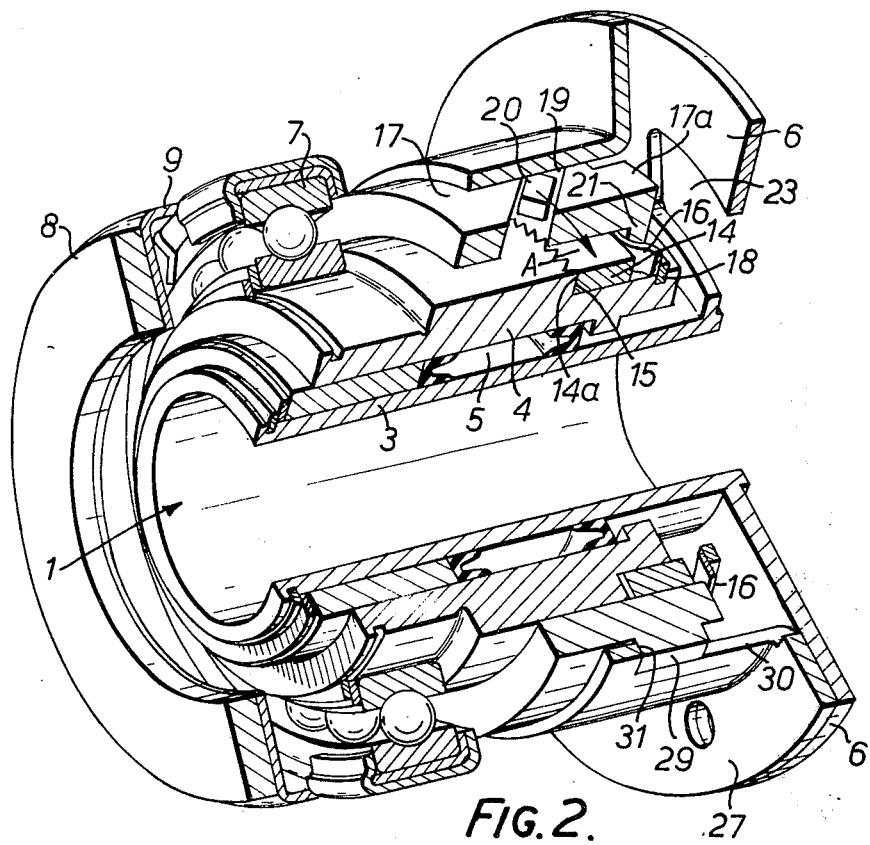
FIG. 2 is a cut-away perspective view of the mechanism of FIG. 1.

The mechanical linkage 12 comprises a ring 14, which is biassed towards a shoulder 15 formed on the outer cylinder 4 by a spring 16, and a cylindrical sleeve 17 which is axially slidable on the outer cylinder and on the ring. The spring 16 is backed by a circlip 18 which is fast to the outer cylinder 4. A plurality of circumferentially disposed helical slots 19 (only one of which is shown in the drawings) are provided on the sleeve 17 and a corresponding number of pegs 20 formed on the ring 14 matingly engage in these slots. Both the shoulder 15 and the adjacent face 14a of the ring 14 are provided with serrations (see FIG. 2).

The braking system 13 comprises a plurality of pressure plates 21 (only one of which is shown in the drawings) and a backing plate 22. Each of the pressure plates 21 is formed integrally with, and at right-angles to, a corresponding extension 17a (only one of which is shown in the drawings) of the sleeve 17. A respective aperture 23 in the flange 6 is aligned with each of the pressure plates 21 so that movement of the sleeve 17 to the right as seen in FIG. 1, will force the pressure plates through these apertures and sandwich that portion of the disc 11 carrying the brake pads 11a between the pressure plates and the backing plate 22. A plurality of helical compression springs 24 (only one of which is shown in FIG. 1) bias the backing plate 22 away from the clutch housing member 25. The backing plate 22 is located, and held in position against rotation, by a plurality of bolts 26 (only one of which is shown in FIG. 1) which pass through a housing member 27, the flange 6, a corresponding aperture 28 in the backing plate and into the housing member 25. The bolts 26 alternate with the compression springs 24 round the circumference of the backing plate 22. The springs 24 introduce a degree of resilience into the braking system 13 so that a too fierce braking action does not result in damage of parts.

The sleeve 17 is provided with three locating pieces 29 (only one of which is shown in the drawings) which run in corresponding slots 30 (only one of which is shown in the drawings) in the housing member 27. Thus axial movement of the sleeve 17 to the left is limited by the portions 31 of the member 27 delimiting the slots 30. The locating pieces 29 and slots 30 also prevent rotation of the sleeve 17. A similar slot/locating piece arrangement (not shown) prevents rotation of the outer cylinder 4.

As referred to above the clutch is disengaged by forcing hydraulic fluid under pressure into the chamber 5 so as to force the outer cylinder 4 to the right carrying with it the ring 14 which is prevented from rotation relative to the outer cylinder by the force of the spring 16 firmly interdigitating the serrations on the face 14a and on the shoulder 15. By means of the pegs 20 on the ring 14 and the helical slots 19 formed in the sleeve 17, the latter is also forced to the right. Consequently, the pressure plates 21 pass through the apertures 23 in the flange 6 and so are poised to engage frictionally the adjacent brake pad 11a on the disc 11. If further pressure is applied to the usual clutch foot pedal (not shown) and further hydraulic fluid is forced into the chamber 5, the outer cylinder 4 moves further to the right so that the pressure plates 21 force the disc 11 onto the backing plate 22 so that the disc is frictionally gripped therebetween and the shaft 10 braked.

When pressure on the clutch foot pedal is relaxed, for the purpose of re-engaging the clutch, the outer cylinder 4 moves back towards its initial position under the force of springs (not shown) which act on the clutch pressure plate. This return movement of the outer cylinder 4 is described in greater detail in copending patent application Ser. No. 475,106. The spring 16 is so rated that, on retraction of the outer cylinder 4, the force exerted by it on the ring 14 is sufficient to prevent the ring from rotating relative to the outer cylinder and thus the sleeve 17 is also carried to the left by the peg-and-slot arrangements 19, 20. However, when the locating pieces 29 engage the slot edges 31 further axial movement of the sleeve 17 is prevented. Thus, should the outer cylinder 4 move further to the left the slots 19 would force the pegs 20 in the direction of arrow A against the force of the spring 16. This would first disengage the serrations on the face 14a of the ring 14 and on the shoulder 15 and then rotate the ring 14 in the direction of the arrow A until the serrations re-engaged. Further movement of the outer cylinder 4 to the left would cause a repetition of this "ratchet" action and the pegs 20 would gradually move out of the slots 19 by a "camming" action. The slots 30 are so positioned that, when the clutch is unworn and in good adjustment, these ratchet and camming actions do not occur as the clutch is re-engaged.

When the clutch is unworn and in good adjustment (see the top half of FIG. 1) the volume of the unexpanded chamber 5 is a maximum and the clutch mechanism is such that the first half of the clutch pedal travel disengages the clutch in the manner referred to above. Throughout this clutch disengaging movement of the outer cylinder 4, the ring 14 and the sleeve 17 are also carried to the right. However, owing to the spacing of the disc 11 from the pressure plates 21 when the clutch is engaged being greater than the travel of the sleeve 17 during clutch disengagement, it is ensured that the clutch is completely disengaged before braking of the shaft 10 can commence. Moreover, the mechanism is such that the brake assembly 13 does not engage the disc 11 until the clutch pedal has been depressed about three-quarters of its travel. Thus, the driver of the vehicle can optionally hold the clutch pedal at half depression thereby only disengaging the clutch or he can depress the pedal further to brake the shaft 10.

When the clutch is badly worn (see the bottom half of FIG. 1) the volume of the unexpanded chamber 5 is greatly reduced and thus, with the clutch in engagement, the outer cylinder 4 is correspondingly further to the left. However, because of the position of the slots 30, the ratchet movement of the ring 14 and the camming action of the pegs 20 out of the slots 19, the sleeve 17 is exactly in the same position as when the clutch in unworn and further depression of the clutch pedal beyond the half depression necessary to disengage the clutch will result in the shaft 10 being braked in the manner described above.

Figure 3:
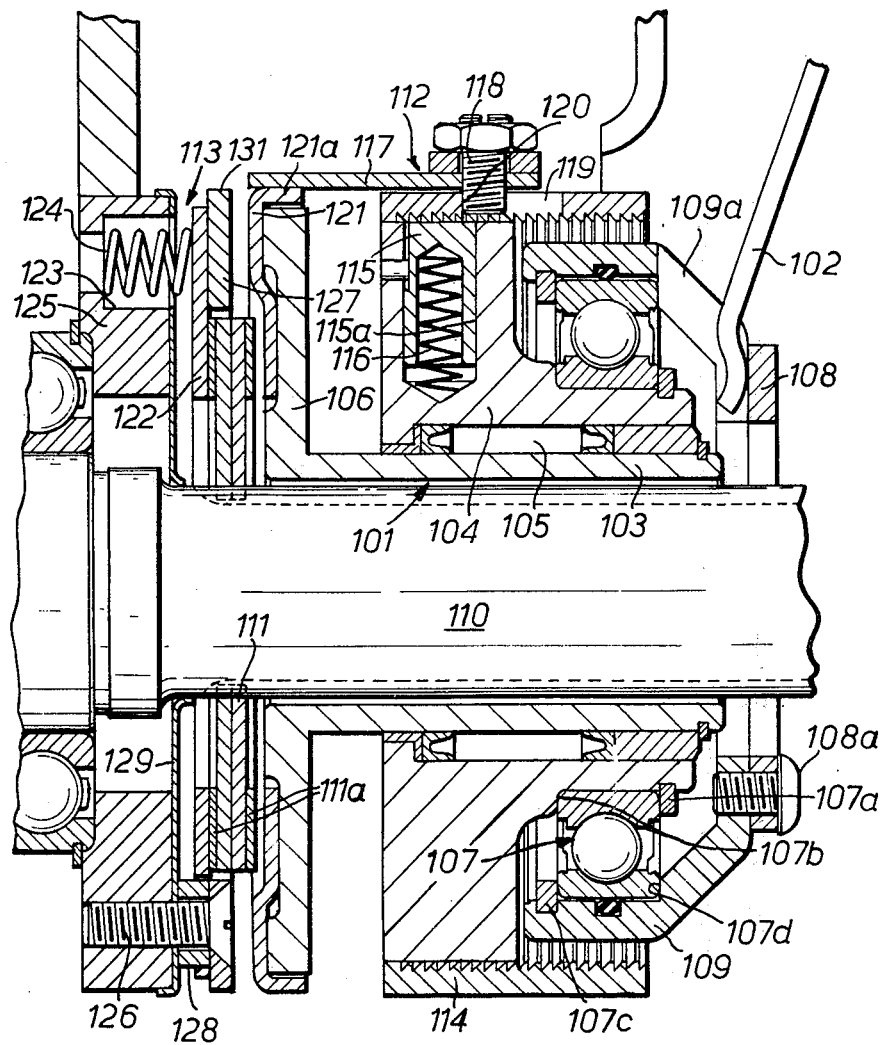
FIG. 3 is a part-sectional elevation of the second form of clutch mechanism.

FIG. 3 shows the second form of clutch mechanism having a clutch pressure plate (not shown) which is arranged to be disengaged by a pull action by means of a hydraulic actuating mechanism, indicated generally by the reference numeral 101, via a number of clutch release levers 102 (only one of which can be seen in FIG. 3).

The hydraulic mechanism 101 comprises a pair of stepped cylinders 103 and 104 which define a chamber 105. Hydraulic fluid can enter the chamber 105 via an inlet port (not shown) in the cylinder 104. The inner cylinder 103 is of twopart construction and is fast to the clutch housing via a flange 106, thus forming the stationary part of a piston-and-cylinder combination, the movable part of which is constituted by the outer cylinder 104. The inner ring of a thrust bearing 107 is rigidly mounted on the movable outer cylinder 104 between a circlip 107a and a shoulder 107b, and the outer ring of the bearing is rigidly mounted to an angled annular ring 109 betwen a circlip 107c and a shoulder 107d. The ring 109 is fixed to a backing ring 108 by rivets 108a and the levers 102 engage the backing ring through slots 109a formed in the ring 109 so that movement of the outer cylinder 104 to the left (as seen in FIG. 3) carries the thrust bearing 107 and thus pulls the levers 102 to the left to disengage the clutch. Movement of the cylinder 104 is effected by forcing hydraulic fluid into the chamber 105. This clutch release mechanism is described in greater detail in the Complete Specification our co-pending British Patent Application No. 26177/73.

When the clutch is engaged the engine output shaft (not shown) drives the transmission input shaft 110 of the heavy motor vehicle. A disc 111, provided on each of its faces with an annular brake pad 111a, is fast to the shaft 110 and a mechanical linkage, indicated generally by the reference numeral 112, is provided to link the hydraulic mechanism 101 to a braking system, indicated generally by the reference numeral 113.

The mechanical linkage 112 includes a cylindrical sleeve 114 which is coaxial with, and surrounds, the outer cylinder 104. The inner cylindrical surface of the sleeve 114 is of buttress tooth form and mates with a corresponding tooth form of six plungers 115 (only one of which can be seen in FIG. 3) which are disposed in six symmetrically disposed radial bores 115a in the outer cylinder 104, each of the plungers being biassed radially outwards by means of a respective spring 116. Thus, the sleeve 114 is supported by means of the spring-loaded plungers 115. A cylindrical sleeve 117 coaxial with, and axially slidable along, the sleeve 114 is provided with three equispaced pegs 118 (only one of which can be seen in FIG. 3), each of the pegs engaging in a respective axial slot 119 in the sleeve 114. Movement of the sleeve 117 to the left (as seen in FIG. 3) is limited by the pegs 118 contacting the end portions 120 of the slots 119.

The braking system 113 comprises a pressure plate 121 and a backing plate 122 which sandwich the disc 111. The pressure plate 121 is provided with an axially extending lug 121a to which the sleeve 117 is fast. A plurality of helical compression springs 124 (only one of which can be seen in FIG. 3) are seated in bores 123 formed in a clutch housing member 125, the springs 124 biassing the backing plate away from the clutch housing member 125, and towards a retainer plate 127 which is fixed to the clutch housing member by means of a number of studs 126 (only one of which is shown in FIG. 3). The studs 126 alternate with the springs 124 around the circumference of the clutch housing member 125 and pass through spacers 128 (only one of which is shown in FIG. 3) and a baffle plate 129. The baffle plate 129 is clamped against the clutch housing member to prevent brake and clutch wear debris collecting in the transmission shaft bearing area (not shown). The backing plate 22 is thus axially slidable and is located radially, and prevented from rotation by, cut-away portions complementary to, and partially enveloping the spacers 128. The springs 124 introduce a degree of resilience into the braking system 113 so that a too fierce braking action does not result in damage to parts.

In operation, the clutch is disengaged by forcing hydraulic fluid under pressure into the chamber 105 so as to force the outer cylinder 104 to the left (as seen in FIG. 3) carrying with it the sleeve 114, owing to the mating engagement of the tooth portions of the plungers 115 and the sleeve 114. When the pegs 118 engage the end portions 120 of the slots 119, the sleeve 117 is also carried to the left so that the pressure plate 121 is poised to engage frictionally the adjacent brake pad 111a on the disc 111. If further pressure is applied to the usual foot pedal (not shown) and further hydraulic fluid is forced into the chamber 105, the outer cylinder 104 moves further to the left so that the pressure plate 121 forces the disc 111 onto the backing plate so that the disc is frictionally gripped therebetween and the shaft 110 braked.

When pressure on the clutch foot pedal is relaxed, for the purpose of re-engaging the clutch, the outer cylinder 104 moves back towards its initial position under the force of springs (not shown) which act on the clutch pressure plate. This return movement retracts the pressure plate 121 thus releasing the braking action and re-engaging the clutch. The springs 116 are so rated that, on retraction of the outer cylinder 4, the force exerted by them on the sleeve 114 is sufficient to carry the sleeve 114 therewith. However, when the pegs 118 engage the slot end portions 120, further axial movement of the sleeve 114 to the right is prevented. Thus, should the outer cylinder 104 move further to the right, a force is applied to the angled flanks of the teeth of the plungers 115. This depresses the plungers, against the biassing force of the springs 116, until the teeth re-engage with the adjacent serrations forming the buttress tooth form on the inner cylindrical surface of the sleeve 114. Further movement of the outer cylinder 104 to the right would cause a repetition of this ratchet action. The slots 119 and pegs 118 are so positioned that, when the clutch is unworn and in good adjustment, this ratchet action does not occur as the clutch is re-engaged.

Throughout the clutch disengaging movement of the outer cylinder 104, the sleeves 114 and 117 are also carried to the left. However, owing to the spacing of the disc 111 from the pressure plate 121 when the clutch is engaged being greater than the travel of the sleeve 114 during clutch disengagement, it is ensured that the clutch is completely disengaged before braking of the shaft 110 can commence. Moreover, the mechanism is such that the brake assembly 113 does not engage the disc 111 until the clutch pedal has been depressed about three-quarters of its travel. The additional pedal effort required to overcome the bias of the springs 124 gives the driver a distinct feel of the onset of the braking action so that he can control the amount of braking applied or alternatively hold the pedal at just the depression required to disengage the clutch.

As wear of the clutch friction plates occurs with time, the clutch release levers 102 move to the right of their initial rest position, causing the outer cylinder 104 to return, as the clutch is re-engaged, to positions progressively further to the right of its initial rest position. However, because of the positioning of the slots 119, the pegs 118 and the ratchet movement of the outer cylinder 104, the sleeve 114 is in exactly the same position, when the clutch is engaged, as it is when the clutch is unworn. Consequently, further depression of the clutch pedal beyond the half depression necessary to disengage the clutch will result in the shaft 110 being braked in the manner described above.

A fine vernier adjustment of the ratchet action may be achieved by a sub-division of the tooth pitch resulting from offsetting each alternate plunger 115 axially by a half tooth pitch. This halves the adjustment steps without weakening the teeth. Alternatively, the tooth form on the inner cylindrical surface of the sleeve 114 may be cut with a three-start pitch.

Figure 4:
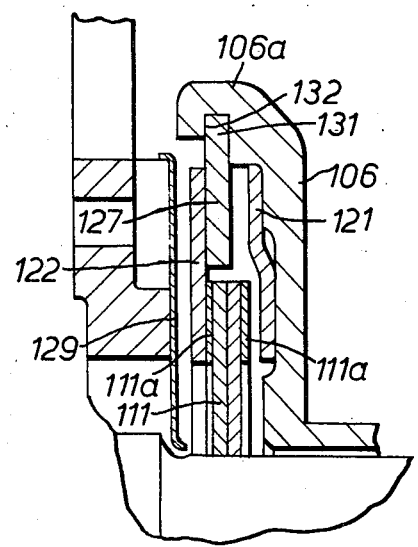
FIG. 4 is an enlarged detail of part of FIG. 3.

The complete hydraulic actuating mechanism 101 and mechanical linkage 112 is made to be mounted directly onto the clutch release levers 102 prior to assembly of the clutch in its housing. The braking system 113, which is fast to the clutch housing, is provided with radial flanges 131 (see FIG. 4) extending from the retainer plate 127. These flanges 131 engage within circumferential slots 132 formed in axial lugs 106a provided on the flange 106. The flanges 131 are inserted into the slots 132 by a rotary interlocking movement of the clutch unit following the fixing of the clutch housing and braking system 113 to the engine. A keep screw (not shown) locks the two parts together.

It will be apparent, therefore, that each of the above described clutch mechanisms is such that clutch and brake control are substantially the same no matter how much the clutch itself is worn. This is a great improvement over known clutch mechanisms of the type in which shaft braking is mechanically linked to clutch disengagement where no such automatic compensation for clutch wear occurs.

I claim:

1. A hydraulically operated clutch mechanism for connecting a driving shaft and a driven shaft, the mechanism comprising:-
   a. a clutch normally effecting a drive connection between said shafts;
   b. hydraulically actuable means for disengaging said drive connection;
   c. brake means for braking said driven shaft;
   d. a mechanical linkage between said hydraulically actuable means and said brake means; and
   e. a compensation means, incorporated in said mechanical linkage, for compensating automatically for any wear of said clutch; said mechanical linkage comprising a first sleeve movable with said hydraulically actuable means and a second sleeve engagable with said brake means, said first sleeve being connected to said second sleeve by said compensation means;
   said compensation means comprising at least one slot formed in one of said sleeves and at least one peg provided on the other of said sleeves, there being as many pegs as there are slots and the peg(s) mating with slot(s); and actuation of said hydraulically actuable means first disengaging said drive connection and then causing braking of said driven shaft.

2. A hydraulically actuated clutch mechanism according to claim 1, wherein each slot is a helical slot and is formed in said second sleeve, means being provided for preventing relative rotation between said first sleeve and said hydraulically actuable means and means being provided for limiting axial movement of said second sleeve.

3. A mechanism as claimed in claim 2, wherein said first sleeve engages said outer cylindrical member.

4. A mechanism as claimed in claim 2, wherein the first sleeve is spring biassed against a shoulder formed on the outer cylindrical member.

5. A mechanism as claimed in claim 4, wherein the second sleeve is slidable on the outer cylindrical member and on the first sleeve.

6. A mechanism as claimed in claim 2, wherein the means for normally preventing said relative rotation comprises cooperating serrated faces formed on the first sleeve and on the shoulder of the outer cylindrical member.

7. A mechanism as claimed in claim 2, wherein a cylindrical housing member surrounding the second sleeve is provided with at least one axial slot and the second sleeve is provided with at least one peg, there being as many pegs as slots and the peg(s) mating with the slot(s), the slot(s) and the peg(s) constituting the means for limiting the axial movement of the second sleeve.

8. A mechanism as claimed in claim 1, wherein the hydraulically actuable means comprises a pair of stepped cylindrical members which form an annular chamber therebetween, the outer cylindrical member being slidable over the inner cylindrical member which is fast to a housing member, and the annular chamber being connectible to a source of hydraulic fluid.

9. A hydraulically actuated clutch mechanism according to claim 8, wherein each slot is an axial slot and is formed in said first sleeve.

10. A mechanism as claimed in claim 1, wherein the brake means is arranged to brake the driven shaft via a disc fast to the driven shaft.

11. A mechanism as claimed in claim 10, wherein the disc is lined with frictional material on its opposite side faces.

12. A mechanism as claimed in claim 9, wherein the first sleeve is releasably attached to the outer cylindrical member.

13. A mechanism as claimed in claim 12, wherein the inner cylindrical surface of the first sleeve is provided with a plurality of circumferential serrations which are engagable with serrations formed on a plurality of spring-loaded plungers provided radially within the outer cylindrical member, the engagement between these serrations providing the releasable attachment between the first sleeve and the outer cylindrical member.

14. A mechanism as claimed in claim 13, wherein the springloaded plungers are equispaced around the outer cylindrical member.

15. A mechanism as claimed in claim 13, wherein the serrations on the inner cylindrical surface of the first sleeve and on the spring-loaded plungers are of buttress tooth form.

16. A mechanism as claimed in 1, wherein the brake means comprises a pressure plate fast to, or integrally formed with, the second sleeve and a backing plate, the pressure plate and the backing plate being situated on opposite sides of the disc so that movement of the pressure plate towards the backing plate traps the disc therebetween.

17. A mechanism as claimed in claim 16, wherein a plurality of pressure plates are provided, each pressure plate being formed integrally with a respective extension of the second sleeve and being aligned with a respective aperture in a housing member through which it can brakingly engage the disc.

18. A mechanism as claimed in claim 16, wherein the backing plate is spring biassed towards the disc.

* * * * *